(12) United States Patent
Zhou et al.

(10) Patent No.: US 9,048,625 B2
(45) Date of Patent: Jun. 2, 2015

(54) NORMAL DISPERSION FREQUENCY COMB

(71) Applicant: The Trustees of Columbia University in the City of New York, New York, NY (US)

(72) Inventors: Heng Zhou, New York, NY (US);
Shu-Wei Huang, New York, NY (US);
Chee Wei Wong, Weehawken, NJ (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/445,959

(22) Filed: Jul. 29, 2014

(65) Prior Publication Data
US 2015/0030040 A1   Jan. 29, 2015

Related U.S. Application Data

(60) Provisional application No. 61/859,441, filed on Jul. 29, 2013.

(51) Int. Cl.
*H01S 3/098* (2006.01)
*H01S 3/11* (2006.01)
*H01S 3/08* (2006.01)

(52) U.S. Cl.
CPC ........... *H01S 3/1106* (2013.01); *H01S 3/08013* (2013.01)

(58) Field of Classification Search
CPC .................. H01S 3/1106; H01S 3/08013

USPC .......................................................... 372/18
See application file for complete search history.

(56) References Cited

U.S. PATENT DOCUMENTS

| 7,712,977 B2 | 5/2010 | Kourogi et al. |
| 7,982,944 B2 | 7/2011 | Kippenberg et al. |
| 8,111,722 B1 | 2/2012 | Maleki et al. |
| 2011/0058248 A1 | 3/2011 | Vodopyanov et al. |
| 2012/0320448 A1 * | 12/2012 | Li et al. .................... 359/332 |
| 2013/0154611 A1 | 6/2013 | Pate et al. |
| 2013/0314703 A1 | 11/2013 | Cox |

FOREIGN PATENT DOCUMENTS

WO    2012146387    11/2012

OTHER PUBLICATIONS

Okinawa et al. "Octave-spanning frequency comb generation in a silicon nitride chip." (Jul. 28, 2011).
Del'Haye,P. "Optical frequency comb generation from a monolithic microresonator." (Dec. 2007) Nature, vol. 450, Issue 7173, p. 1214-1217.

(Continued)

*Primary Examiner* — Tuan Nguyen
(74) *Attorney, Agent, or Firm* — Lisa A. Chiarini; Walter M. Egbert, III; Hughes Hubbard & Reed LLP

(57) ABSTRACT

Normal group velocity dispersion mode-locked optical frequency combs are provided on-chip. On-chip coherent frequency comb generation includes pulses showing temporal durations of about 74 fs. Pump detuning and bandpass filtering are provided for stabilizing and shaping the pulses from normal group velocity dispersion microresonators.

9 Claims, 22 Drawing Sheets

(56) References Cited

OTHER PUBLICATIONS

Wang, C.Y. et al., "Mid-infrared optical frequency combs at 2.5 μm based on crystalline microresonators." (Jan. 8, 2013) Nature Communications, vol. 4, Issue 1345.

Ferdous, F. et al. "Spectral line-by-line pulse shaping of on-chip microresonator frequency combs." (Oct. 9, 2011), Nature Photonics, vol. 5, Issue 12, p. 770-776.

Herr, T. et al. "Mode-locking in an optical microresonator via soliton formation." (2012) arXiv preprint, arXiv:1211.0733, p. 1-11.

Saha, K. "Modelocking and femtosecond pulse generation in chip-based frequency combs." (2012) arXiv preprint, arXiv:1211.1096.

\* cited by examiner

NORMAL DISPERSION FREQUENCY COMB

CROSS-REFERENCE TO RELATED APPLICATIONS

This application claims the benefit of U.S. Provisional Application No. 61/859,441, filed Jul. 29, 2013.

STATEMENT REGARDING FEDERALLY SPONSORED RESEARCH

This invention was made with government support under grant numbers DGE-1069240 and ECCS-11022 awarded by the National Science Foundation (NSF) and grant number W31P4Q-12-C-0225 awarded by the Defense Advanced Research Projects Agency (DARPA). The government has certain rights in the invention.

BACKGROUND

Embodiments of the present invention relate to optical frequency combs, and more specifically, to generation of optical frequency combs using microring resonators.

Optical frequency combs, with the broad optical bandwidth of ultrafast lasers and the optical-radio frequency (RF) clockwork, enable precision spectroscopy, frequency metrology, and astrophysical spectrography. Ultrafast pump-probe experiments, exploiting the ultrafast pulse durations, have made tremendous progress in electronic/molecular dynamics. Ultimately, a combination of frequency comb and temporal pulse-shaping technologies enables generation of arbitrary optical waveforms with applications in communications and coherent control of ultrafast chemistry.

Continuous-wave (cw) pumped monolithic microresonators serve as an alternative platform for comb generation through broadband four-wave mixing (FWM). With anomalous group-velocity-dispersion (GVD) and self-phase modulation (SPM), optical solitons can be generated, demonstrating broad bandwidths and RF-optical stability. Obtaining anomalous GVD broadly across arbitrary center frequencies, however, is challenging for microresonators. Dispersion engineering by conformal coating and waveguide shaping are possible, but often lead to lower cavity optical quality factors (Qs).

Thus, there remains a need for microresonator-based optical frequency combs displaying normal dispersion.

BRIEF SUMMARY

According to one embodiment of the present invention, an apparatus for generating a frequency comb is provided. The apparatus includes a continuous wave pump coupled to a microring resonator. The microring resonator is configured to emit a mode-locking frequency comb by normal dispersion. In some embodiments, the microring resonator has a radius of about 200 µm, a cross-sectional width of about 2 µm and a cross-sectional height of about 0.725 µm. In some embodiments, the microring resonator comprises silicon nitride. In some embodiments, the microring resonator is configured to emit an optical pulse of about 74 femtoseconds. In some embodiments, the frequency comb is coherent.

In some embodiments, the apparatus further comprises a spectral filter coupled to an output of the microring resonator. In some embodiments, the spectral filter comprises a bandpass filter. In some embodiments, the mode-locking frequency comb comprises a plurality of mode-locked modes. In some embodiments, the mode-locking frequency comb comprises at least about 200 mode-locked modes. In some embodiments, the mode-locking frequency comb comprises at least about 300 mode-locked modes. In some embodiments, the mode-locking frequency comb comprises at least about 400 mode-locked modes. In some embodiments, the mode-locking frequency comb has a repetition rate of about 116 GHz. In some embodiments, the mode-locking frequency comb has a span of at least about 200 nm.

DETAILED DESCRIPTION

According to embodiments of the present disclosure, normal GVD mode-locked frequency combs on-chip are provided. The observation is supported by phase noise characterization, direct frequency-resolved optical gating (FROG) pulse measurement, and first-principles nonlinear coupled-mode modeling. All comb spectral lines may be collected in FROG pulse measurement and the phase-retrieved pulses demonstrate mode-locking down to 74 fs. Nonlinear coupled-mode modeling of the comb growth and dynamics, with measured GVD and Qs, confirms the feasibility of mode-locked frequency comb generation and agrees with the measurements presented herein. Effective bandpass filtering is demonstrated herein, facilitated by wavelength-dependent Qs as well as the cw pump detuning in stabilizing and shaping the pulses generated in the normal GVD microresonators.

Figure 1A:
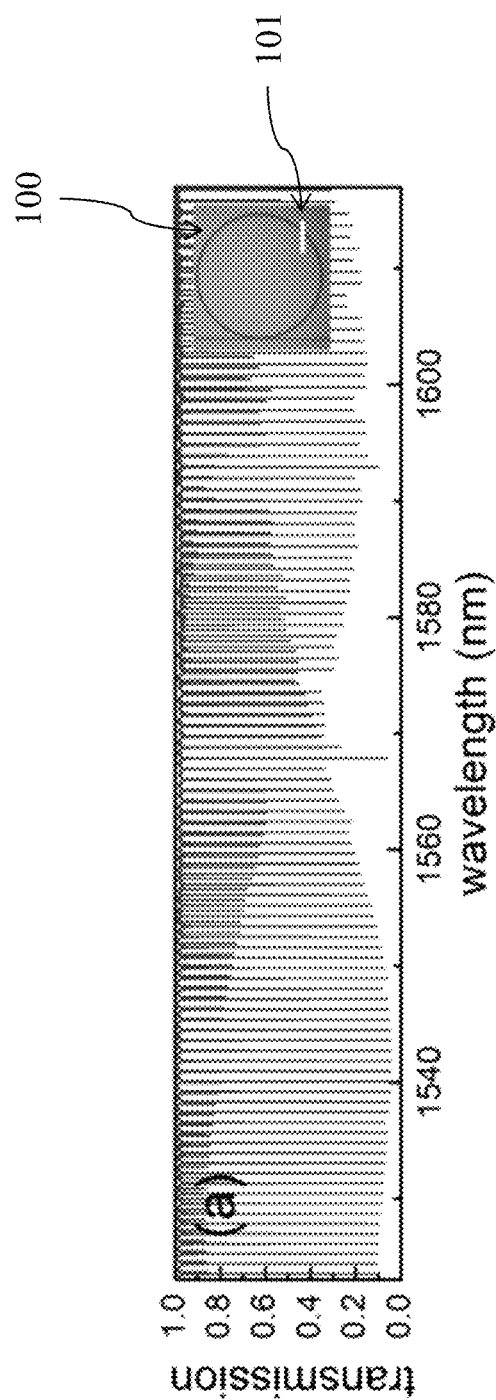
FIG. 1A depicts the transmission of the multi-moded family of a $Si_3N_4$ microring resonator according to an embodiment of the present disclosure.

Turning now to FIG. 1A, the transmission of the multi-moded family of a $Si_3N_4$ microring resonator according to an embodiment of the present disclosure is depicted. The inset is an optical micrograph of ring resonator 100 of this embodiment, having a 200 μm radius, 2 μm waveguide width, and 725 nm waveguide height. Scale bar 101 is 100 μm.

Five mode families (3 TE and 2 TM) are identified from the transmission curve and each Lorentzian resonance fitted to determine its frequency and Q-factor (described below). The frequency data is then used to evaluate GVD of the mode family. A loaded Q-factor of more than $10^6$ is achieved at 1600 nm while the Q-factors at the telecommunications C-band wavelengths are more than 4× lower due to residual N—H absorption. Q-factors also reduce at longer than 1625 nm due to increasing coupling loss. Therefore, the resonator has a distinct spectrally restricted area characterized with the highest Q-factor. As shown later, this feature is responsible for the mode-locking observed in various embodiments of the present disclosure.

Figure 1B:
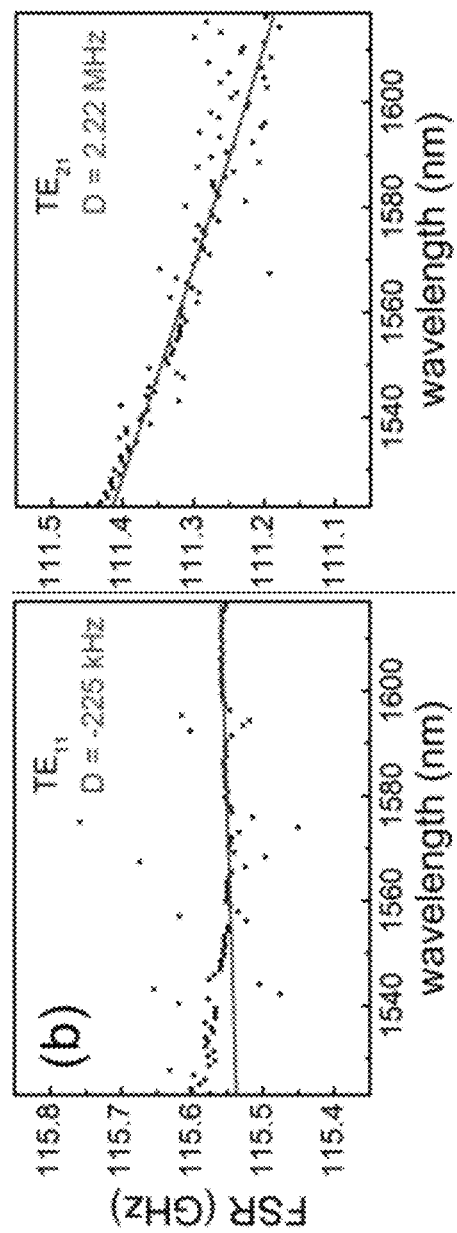
FIG. 1B shows measured dispersions of the $TE_{11}$ and $TE_{21}$ modes supported by a ring resonator according to an embodiment of the present disclosure.

FIG. 1B illustrates the wavelength dependence of the free spectral range (FSR) of a resonator according to embodiments of the present disclosure. The dots are experimental results derived from the transmission measurement show in FIG. 1A, while the solid lines are the linear fits with the slopes obtained from simulation. The non-equidistance of the modes, $D_2$, is defined as $D_2 = -\beta_2 c \omega_{FSR}^2/n_0$, where c is the speed of light, $\beta_2$ is the group velocity dispersion, $\omega_{FSR}$ is the free spectral range, and $n_0$ is the effective refractive index of the ring resonator.

Thus, FIG. 1B shows measured dispersions of the $TE_{11}$ and $TE_{21}$ modes supported by this embodiment of a ring resonator, which are in good agreements with simulations using a full-vector finite-element mode solver (red curves). Across the whole L-band, the fundamental mode features a globally normal GVD with local disruptions induced by mode interaction. Some measurement-simulation discrepancy at the C-band is attributed to the residual N—H overtone absorption. The microresonator is pumped with an L-band tunable external-cavity diode laser amplified by an EDFA (described further below).

Figure 1C:
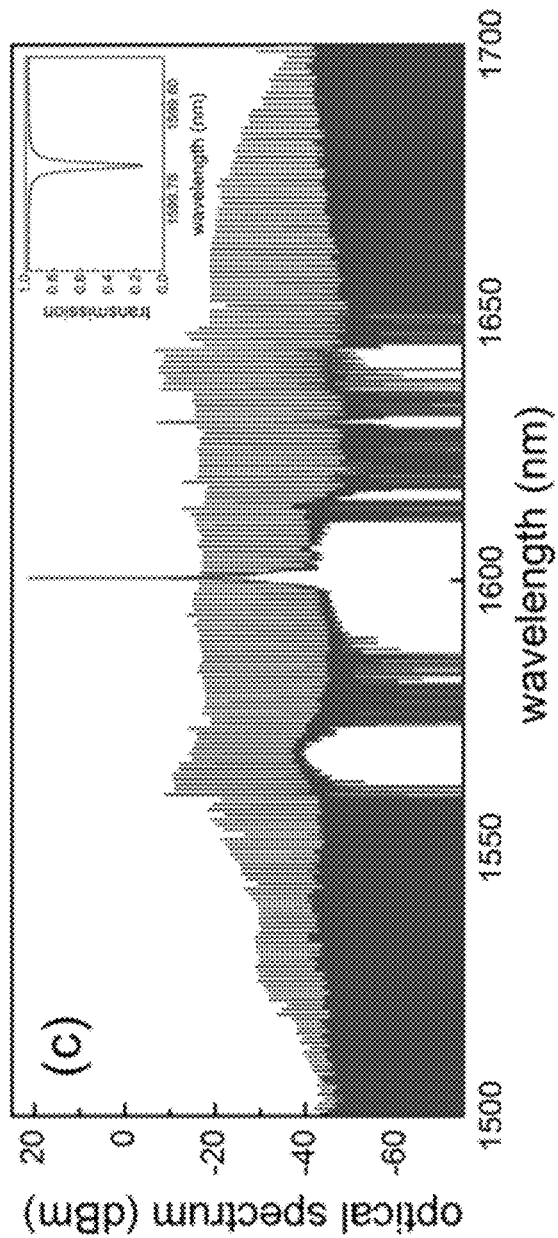
FIG. 1C shows an example of a Kerr frequency comb according to embodiments of the present disclosure.

FIG. 1C depicts an example of a Kerr frequency comb, spanning 200 nm generated with 800 mW cw pump power coupled to the fundamental mode. The spectral width of the frequency comb far exceeds that of alternative normal group-velocity dispersion (GVD) combs.

Figure 2A:
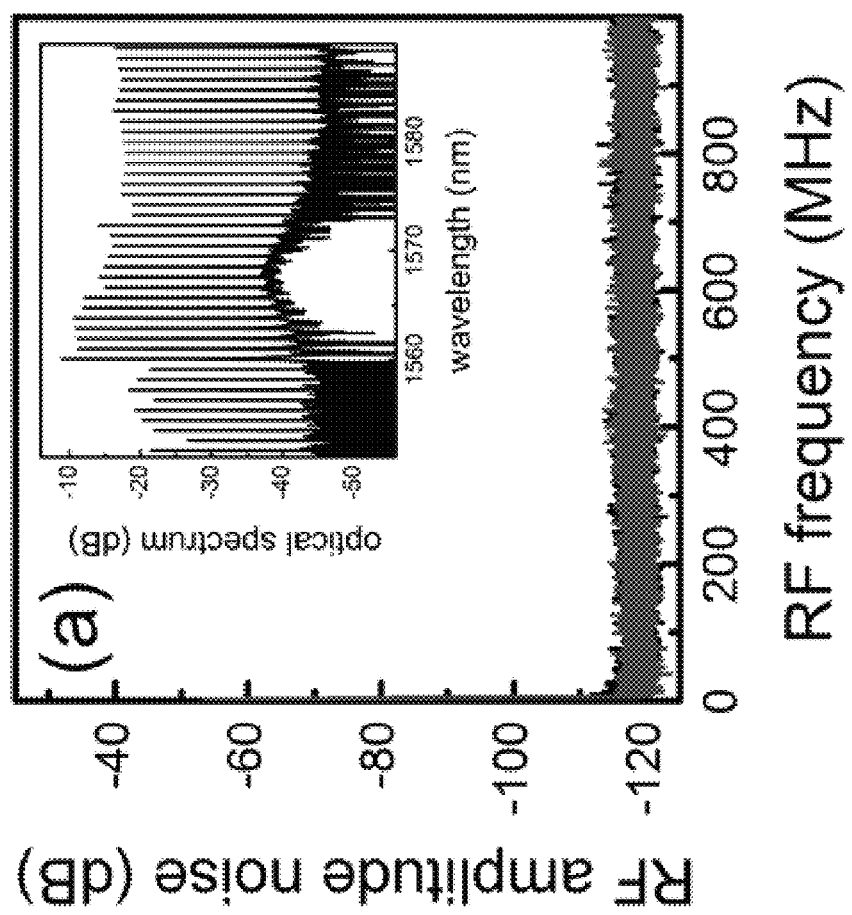
FIG. 2A shows the RF amplitude noise of the Kerr comb along with the detector background according to an embodiment of the present disclosure.

FIG. 2A shows the RF amplitude noise of the Kerr comb (black curve) along with the detector background (red curve), indicating the low phase noise operation. For the RF amplitude noise measurement, a 10 nm portion of the optical spectrum (1560 nm to 1570 nm) is filtered from the comb. The inset includes a zoomed view of the optical spectrum, showing a clean comb structure.

As shown in FIG. 2A, the optical spectrum shows a clean mode structure with comb lines separated by single free spectral range (FSR) of the fundamental mode family, without identifiable noise peaks between the comb lines. The coherence of the generated Kerr frequency comb can be determined by measuring the RF amplitude noise and by performing a cw heterodyne beat note measurement. Both measurements confirm coherence of the frequency comb. The use of RF amplitude noise may be used as a measure of low phase noise operation has. In this example, the RF scan range of 1 GHz is more than five times larger than the cavity linewidth. With resonance detuning and pump power values according to embodiments of the present disclosure, the frequency comb is driven into the low phase noise regime as shown. Alternative parameter sets, discussed further below, result in similar RF amplitude noise evolution associated with comb formation dynamics.

Figure 2B:
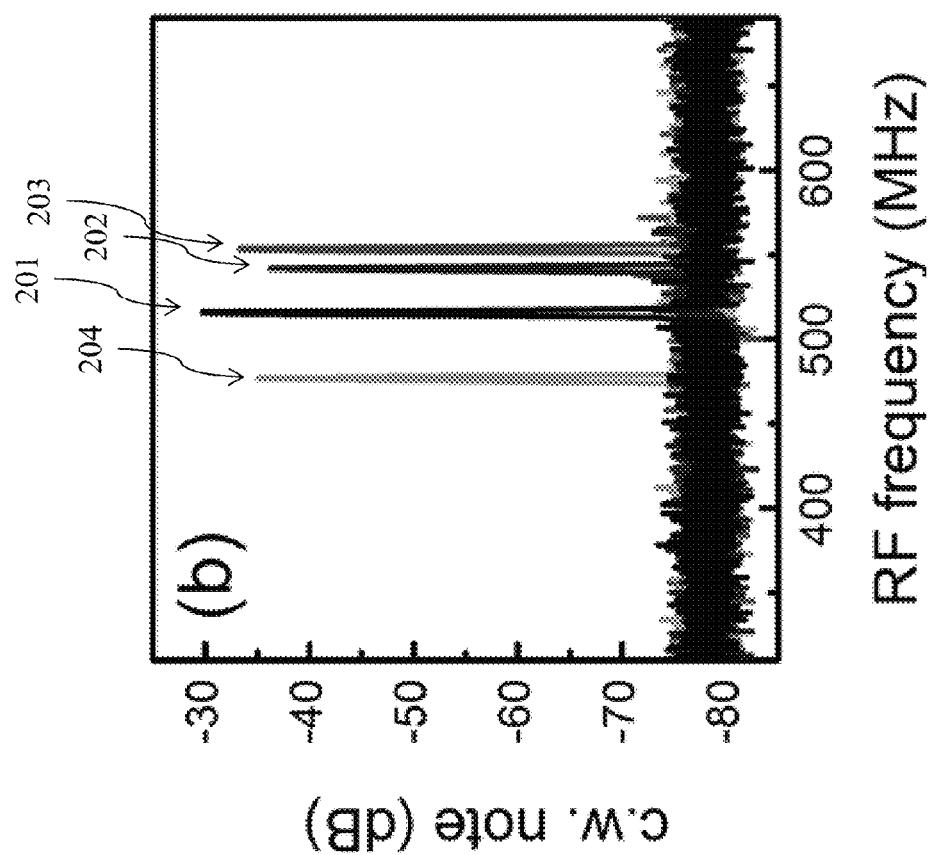
FIG. 2B shows cw heterodyne beat notes between a cw laser and different comb lines according to embodiments of the present disclosure.

FIG. 2B shows cw heterodyne beat notes between a cw laser and different comb lines. Comb line 201 corresponds to the pump; comb line 202 corresponds to the 10th mode; comb line 203 corresponds 20th mode; comb line 204 corresponds to the 21st mode. No line width broadening of the comb lines relative to the pump is observed, showing the comb retains a similar level of phase noise as the cw laser. Besides the beat note of the cw laser with the pump laser, beat notes between the cw laser and different comb lines are also measured. All beat notes exhibit the same line width of 800 kHz, limited by coherence between the cw laser and the pump laser. Neither additional line width broadening of the comb lines relative to the pump nor multiple beat notes were observed, confirming the comb lines exhibit a similar level of phase noise as the pump.

Figure 3A:
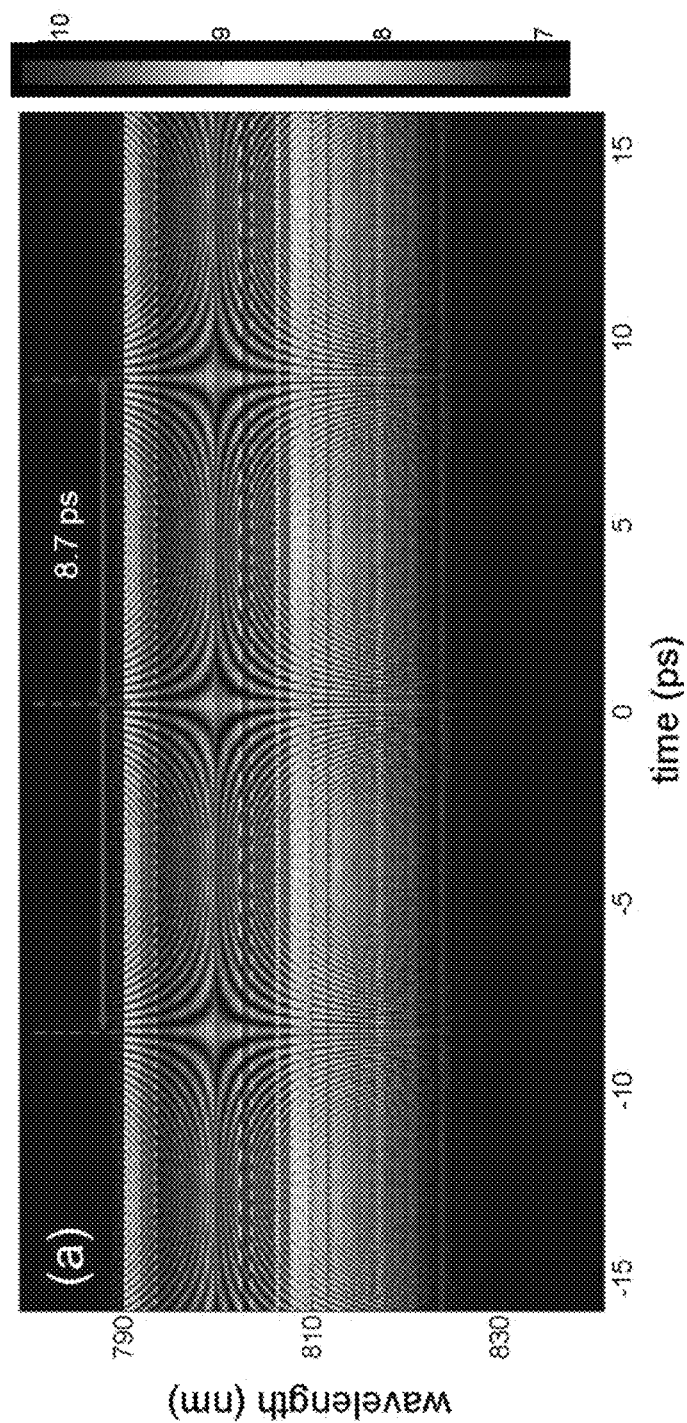
FIG. 3A depicts a FROG spectrogram with 32 ps delay scan according to embodiments of the present disclosure.

Referring now to FIGS. 3A-D, a FROG trace is depicted. Pulse duration is measured via sub-femto-joule sensitive second-harmonic-generation (SHG) frequency-resolved optical gating (FROG) without involvement of any additional optical bandpass filter and optical amplifier to minimize pulse distortion. FIG. 3A is the spectrogram with 32 ps delay scan and it shows a pulse train with a period of 8.7 ps, the inverse of the fundamental mode family's FSR (115.56 GHz). For better visualizations, FIG. 3A is plotted on log-scale and the bright cw pump component is removed in the plotting. Spectral interferometric fringes are clearly visible for delays longer than the pulse duration, arising from interference the cw pump background with the pulse and leading to the generation of two temporally separated SHG FROG signal pulses. The fringes become sparse as the delay approaches zero and the FROG fringe patterns depend on the relative phase between the cw pump and the pulse.

Figure 3B:
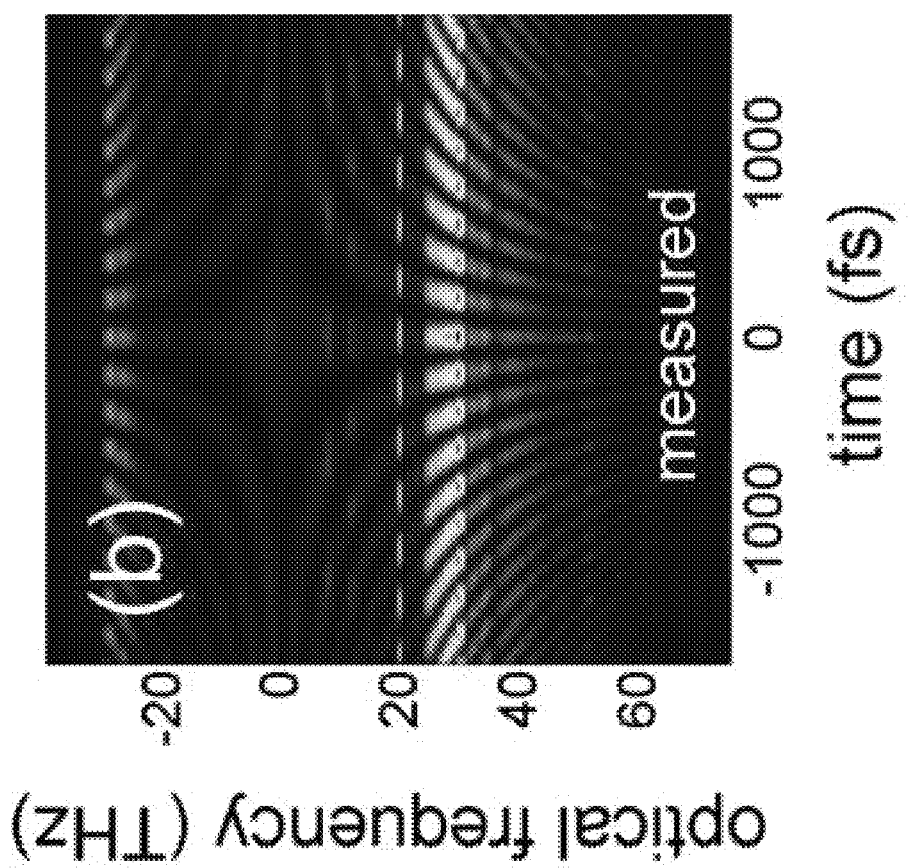
FIG. 3B depicts a FROG spectrogram with a time resolution of 4 fs according to embodiments of the present disclosure.
Figure 3C:
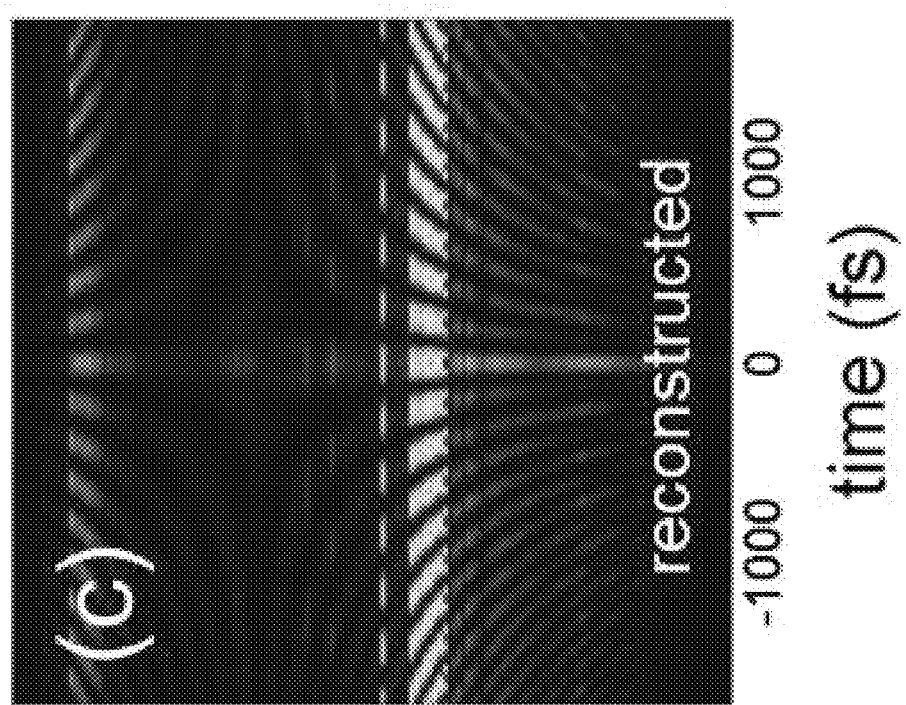
FIG. 3C depicts a reconstructed FROG spectrogram achieved by use of genetic algorithms according to embodiments of the present disclosure.

FIG. 3B is the spectrogram measured with a finer time resolution of 4 fs. FIG. 3C is the reconstructed spectrogram with a FROG error of 3%. For better visualization, only the central part of the FROG spectrogram is shown in FIGS. 3B-C, but the FROG analysis is done on the full spectrogram. Due to the complexity of the pulses, an iterative genetic algorithm is developed specifically to retrieve the spectrograms.

Figure 3D:
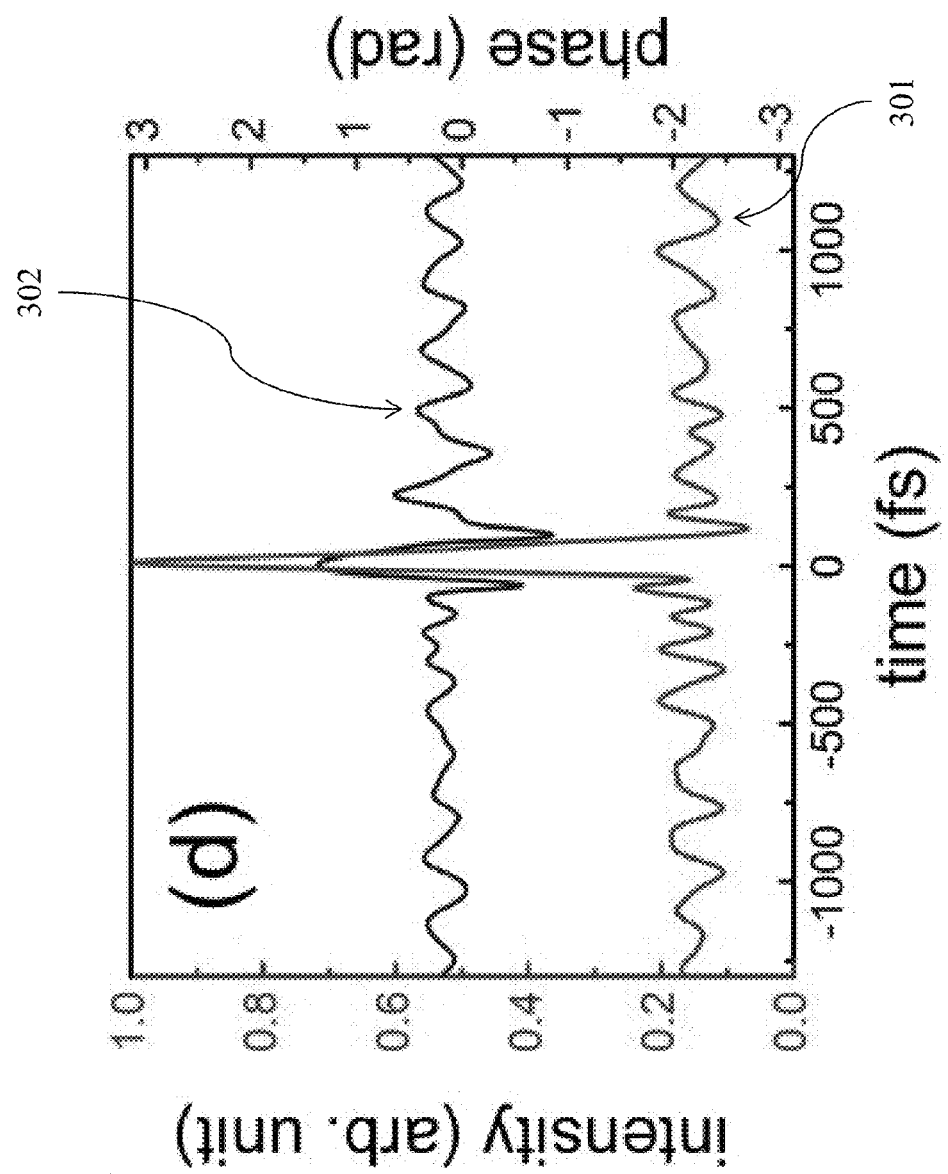
FIG. 3D depicts retrieved pulse shape and temporal phase profile according to embodiments of the present disclosure.

FIG. 3D shows the retrieved pulse shape 301 and temporal phase profile 302, with a 1.3 rad relative phase contrast observed within the pulse. The full-width-half-maximum (FWHM) pulse duration is measured at 74 fs, positively chirped from its transform-limited FWHM pulse duration of 55 fs. Due to the strong cw pump, the pulse is sitting on a 20% background of its peak amplitude.

The closed-form solution of the master equation for the Kerr comb and pulse generation according to embodiments of the present disclosure is shown in Equation 1.

$$T_R \frac{\partial}{\partial T}A + \frac{i}{2}\left(\beta_{2\Sigma} + i\frac{T_c}{\Omega_f^2}\right)\frac{\partial^2}{\partial t^2}A - i\gamma |A|^2 A =$$
$$-\left(\alpha + \frac{T_c}{2} + i\delta_0\right)A + i\sqrt{T_c P_{in}}\, e^{i\varphi_{in}}$$

Equation 1

In Equation 1, A(T,t) is the slowly varying envelope of the electric field in the microresonator, $T_R$ the cavity roundtrip time, t the retarded time, T the slow time of the cavity, $\beta_{2\Sigma}$ the cavity GVD, $T_c$ the power coupling loss per roundtrip, $\Omega_f$ the spectral characteristics of the coupling, $\gamma$ the nonlinear coefficient, $\alpha$ the amplitude attenuation per roundtrip, $\delta_0$ the resonance detuning, and $\sqrt{P_{in}}e^{i\varphi_{in}}$ the cw pump. In this example, for simplicity, it is assumed the bandpass filter in the microresonator results purely from the wavelength-dependent coupling loss:

$$T_{coupling} \approx T_c\left[1 + \frac{(\omega_c - \omega)^2}{\Omega_f^2}\right],$$

where $\omega_c$ is the frequency for maximal coupling. Assuming Gaussian input pulse and applying the variational method, the equations describing the mode-locked pulses are derived in Equation 15, discussed below. Defining chirp q, pulse energy $E_p$, and the pulse duration $\tau$, and with $q^2 \gg \Omega_f^2 \tau^2 \gg 1$, we obtain the resulting solutions in Equation 2, Equation 3, and Equation 4.

$$E_p \approx \frac{8\sqrt{10\pi}}{15} \frac{\beta_{2\Sigma}^{3/2} \Omega_f^2 \sqrt{\delta_0}}{T_c \gamma}$$

Equation 2

$$\tau \approx \frac{2\sqrt{5}}{3} \frac{\beta_{2\Sigma}^{3/2} \Omega_f^2}{T_c \sqrt{\delta_0}}$$

Equation 3

$$q \approx \frac{4\beta_{2\Sigma}\Omega_f^2}{3T_c}$$

Equation 4

By fitting the measured Q-factor (FIG. 5) of the ±20 modes around $Q_{max}$ with the wavelength-dependent coupling loss profile defined above, a filter bandwidth of 2.3 THz is found. A chirp q of 1.6 is then obtained after the filter bandwidth and the other measured parameters ($T_c$=0.003, $\beta_{2\Sigma}$=17.14 fs$^2$) are entered into Equation 4. This chirp is close to that obtained from the FROG measurement (q=1.5), and the resulting calculated pulse duration (98 fs; with FWHM definition) is close to the measurements set out herein.

While the total power in the microresonator reduces as the pump detuning gets larger, Equation 2 and Equation 3 show the pulse energy actually increases and the pulse duration gets shorter. Overall, the pulse quality improves. This illustrates the active role of pump detuning: it is not simply a parameter that controls the microresonator coupled power, but an important factor that determines the pulse duration and energy distribution between the pulse and cw background. Furthermore, the closed-form solutions show that the pulse generated from a normal GVD microresonator is always chirped (Equation 4), and a narrower filter keeps the pulse short when the cavity dispersion increases.

According to various embodiments of the present disclosure, methods and apparatus for on-chip normal GVD frequency combs are provided. The comb properties are supported by phase noise characterization, direct FROG pulse measurement, and first-principles nonlinear coupled-mode modeling. In some embodiments, the passive mode-locking achieves 74 fs pulses, with 116 GHz repetition rates in the chip-scale oscillator. In addition, the present disclosure provides that pump detuning and effective bandpass filtering are used in stabilizing and shaping the pulses from normal GVD microresonators.

Figure 4A:
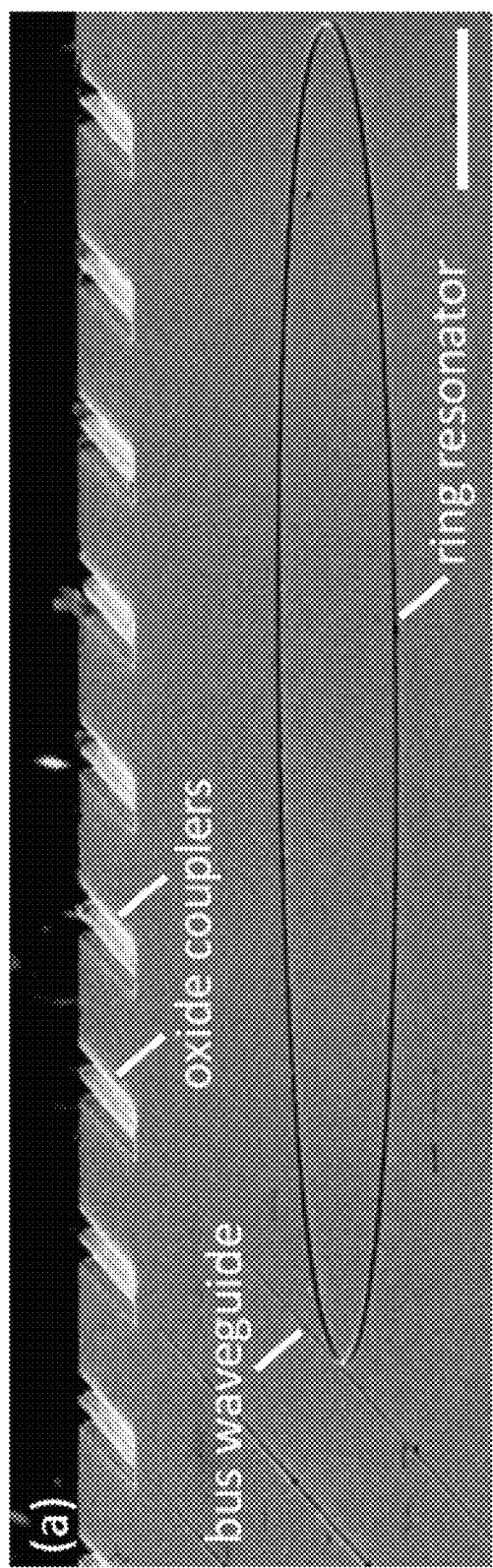
FIG. 4A is a scanning electron micrograph of the chip-scale ring resonator according to an embodiment of the present disclosure.

FIG. 4A is a scanning electron micrograph of the chip-scale ring resonator according to an embodiment of the present disclosure. It shows the layout of a ring resonator and the refractive index of the low pressure chemical vapor deposition (LPCVD) Si$_3$N$_4$. In some embodiments, due to the large refractive index of the Si$_3$N$_4$ waveguide, a 600 µm long adiabatic mode converter is implemented to improve the coupling efficiency from the free space to the bus waveguide. In some embodiments, the adiabatic mode converter comprises the Si$_3$N$_4$ waveguide, embedded in the 5×5 µm$^2$ SiO$_2$ waveguide, with gradually changing widths from 0.2 µm to 1 µm. The input-output insertion loss for the waveguide does not exceed 6 dB.

Figure 4B:
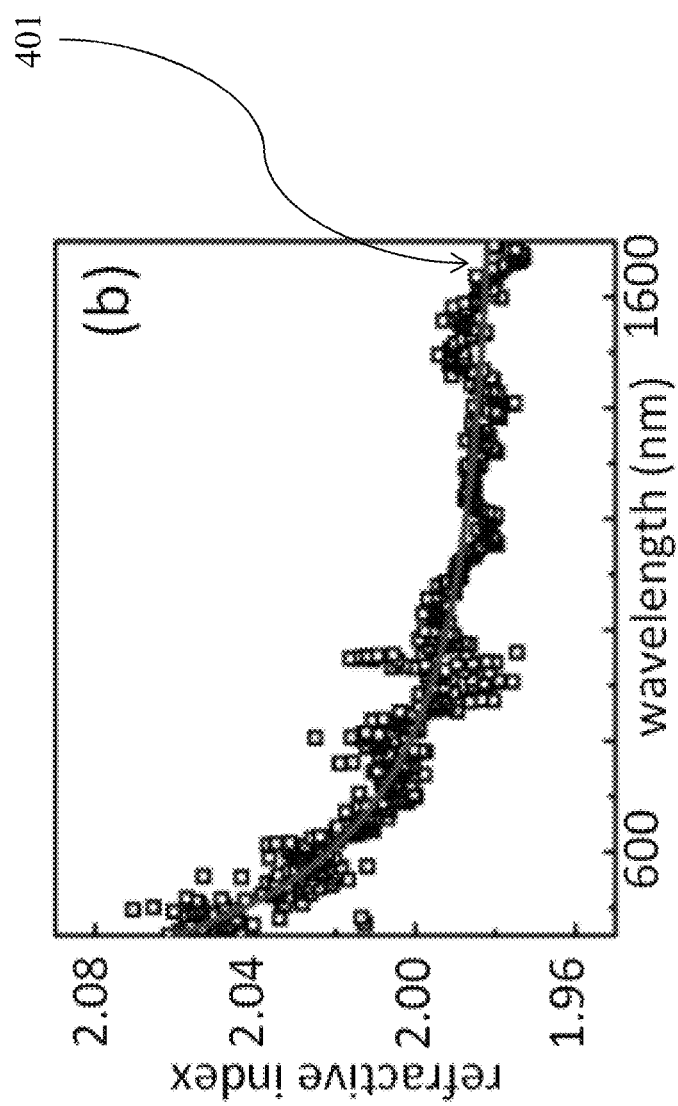
FIG. 4B depicts spectroscopic ellipsometer measurements of the refractive index of the LPCVD $Si_3N_4$ according to embodiments of the present disclosure.

The refractive index is measured with an ellipsometric spectroscopy and curve 401 is the fitted Sellmeier equation assuming a single absorption resonance in the ultraviolet (FIG. 4B). The fitted Sellmeier equation, $$n(\lambda) = \sqrt{1 + \frac{(2.90665 \pm 0.00192)\lambda^2}{\lambda^2 - (145.05007 \pm 1.03964)^2}},$$

may then be used for waveguide dispersion simulation, for example by COMSOL Multiphysics, which includes both the material dispersion and the geometric dispersion.

Microresonators according to the present disclosure may be fabricated according to the following procedure. First a 3 µm thick SiO$_2$ layer is deposited via plasma-enhanced chemical vapor deposition on p-type 8" silicon wafers to serve as the under-cladding oxide. Then LPCVD is used to deposit a 725 nm silicon nitride for the ring resonators, with a gas mixture of SiH$_2$Cl$_2$ and NH$_3$. The resulting Si$_3$N$_4$ layer is patterned by optimized 248 nm deep-ultraviolet lithography and etched down to the buried SiO$_2$ via optimized reactive ion dry etching. The sidewalls are observed under SEM for an etch verticality of 88 degrees. The nitride rings are then over-clad with a 3 µm thick SiO$_2$ layer, deposited initially with LPCVD (500 nm) and then with plasma-enhanced chemical vapor deposition (2500 nm). The device used in this study has a ring radius of 200 µm, a ring width of 2 µm, and a ring height of 0.725 µm.

Figure 5:
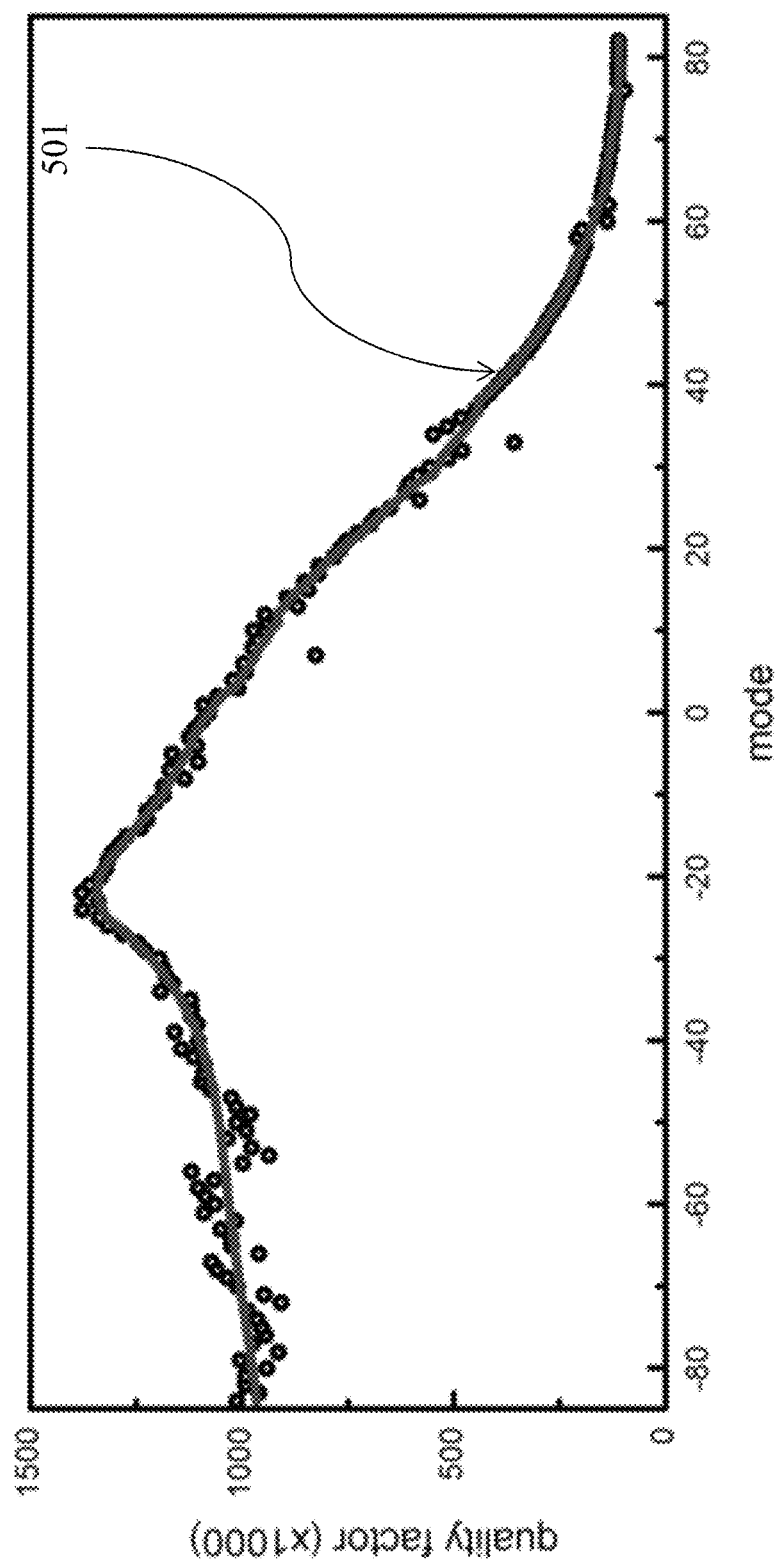
FIG. 5 depicts Q quantification of the resonant modes of embodiments of the present disclosure.

FIG. 5 shows the wavelength-dependent Q-factors of ring resonators according to embodiments of the present disclosure, determined by Lorentzian fitting of cavity resonances. The intrinsic absorption from the residual N—H bonds results in the loaded Qs' roll-off at the short wavelengths while the increasing coupling loss is responsible for the roll-off at the long wavelengths. The red curve 501 is the fitting of the loaded Qs. The loaded Q reaches its maximum (~1.4M) at 1625 nm and gradually decreases on both ends due to the residual N—H absorption at the short wavelengths and the increasing coupling loss at the long wavelengths. This effective bandpass filter plays a role in pulse generation from the normal-dispersion microresonators of the present disclosure.

Figure 6:
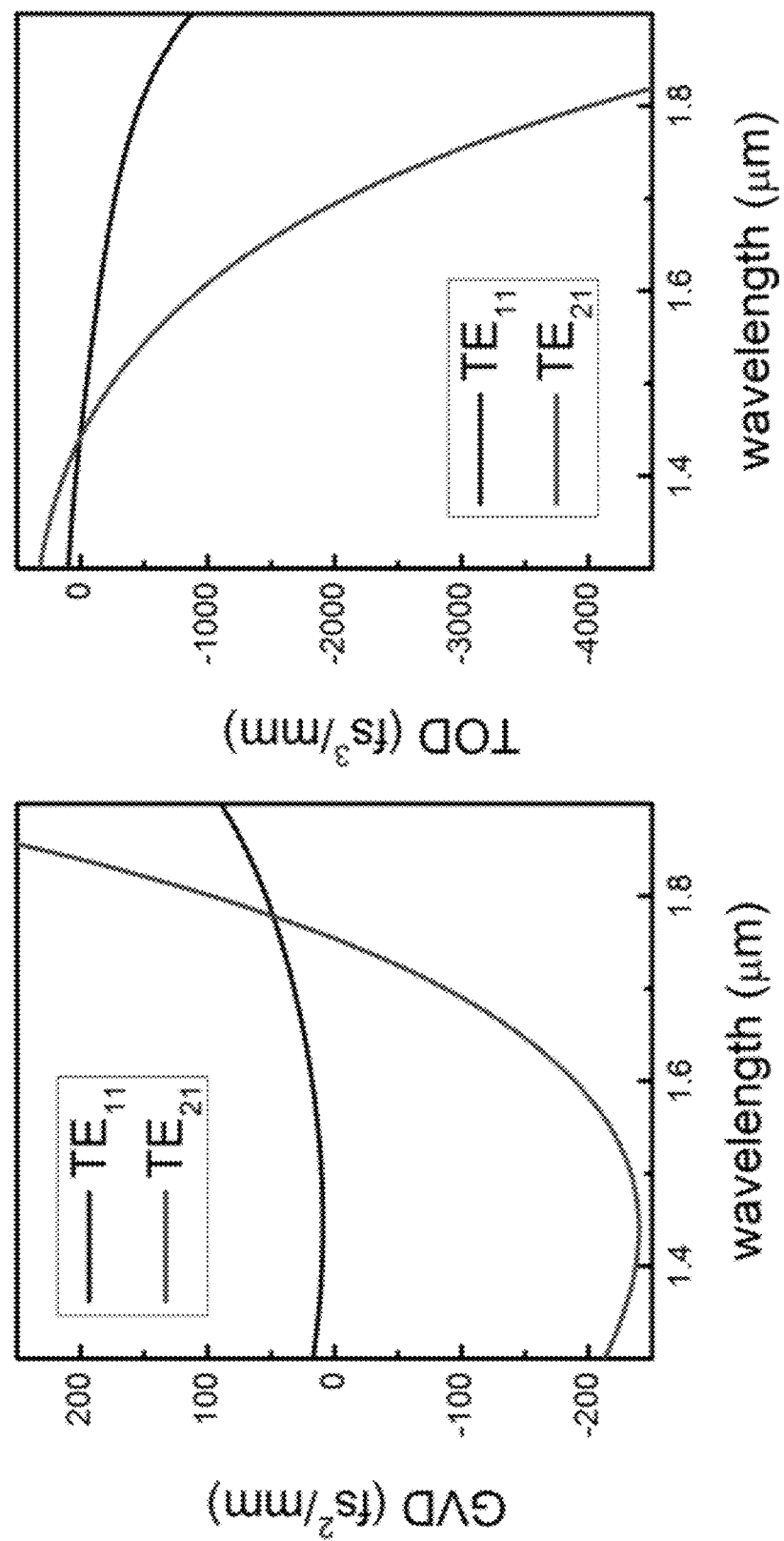
FIG. 6 depicts simulated GVD and TOD of the ring resonator according to an embodiment of the present disclosure.

FIG. 6 shows the dispersions of the ring resonator calculated with a commercial full-vector finite-element-mode solver (for example, COMSOL Multiphysics), taking into account both the waveguide dimensions and the material dispersion. The fundamental mode features normal GVD across the whole telecommunication wavelength range while the first higher order mode possesses anomalous GVD. The fundamental mode also features small TOD at the telecommunication wavelength range, beneficial for broad comb generation. Modeling is performed on 50 nm triangular spatial grid with perfectly-matched layer absorbing boundaries and 5 pm spectral resolution. Since the ring radius is large, the bending loss and the bending dispersion of the resonator waveguide are negligible in the ring resonators of the present disclosure. The fundamental mode ($TE_{11}$) features small normal group velocity dispersion (GVD) and small third-order dispersion (TOD) across the whole telecommunication wavelength range while the first higher order mode ($TE_{21}$) possesses large anomalous GVD and large TOD. GVD and TOD are defined in accordance with Equation 5 and Equation 6.

$$GVD \equiv \frac{\partial^2 \varphi}{\partial \omega^3} = \frac{\lambda^3}{2\pi c_0^2} \frac{d^2 n}{d\lambda^2} \qquad \text{Equation 5}$$

$$GVD \equiv \frac{\partial^2 \varphi}{\partial \omega^3} = \frac{\lambda^3}{2\pi c_0^2} \frac{d^2 n}{d\lambda^2} \qquad \text{Equation 6}$$

Figure 7:
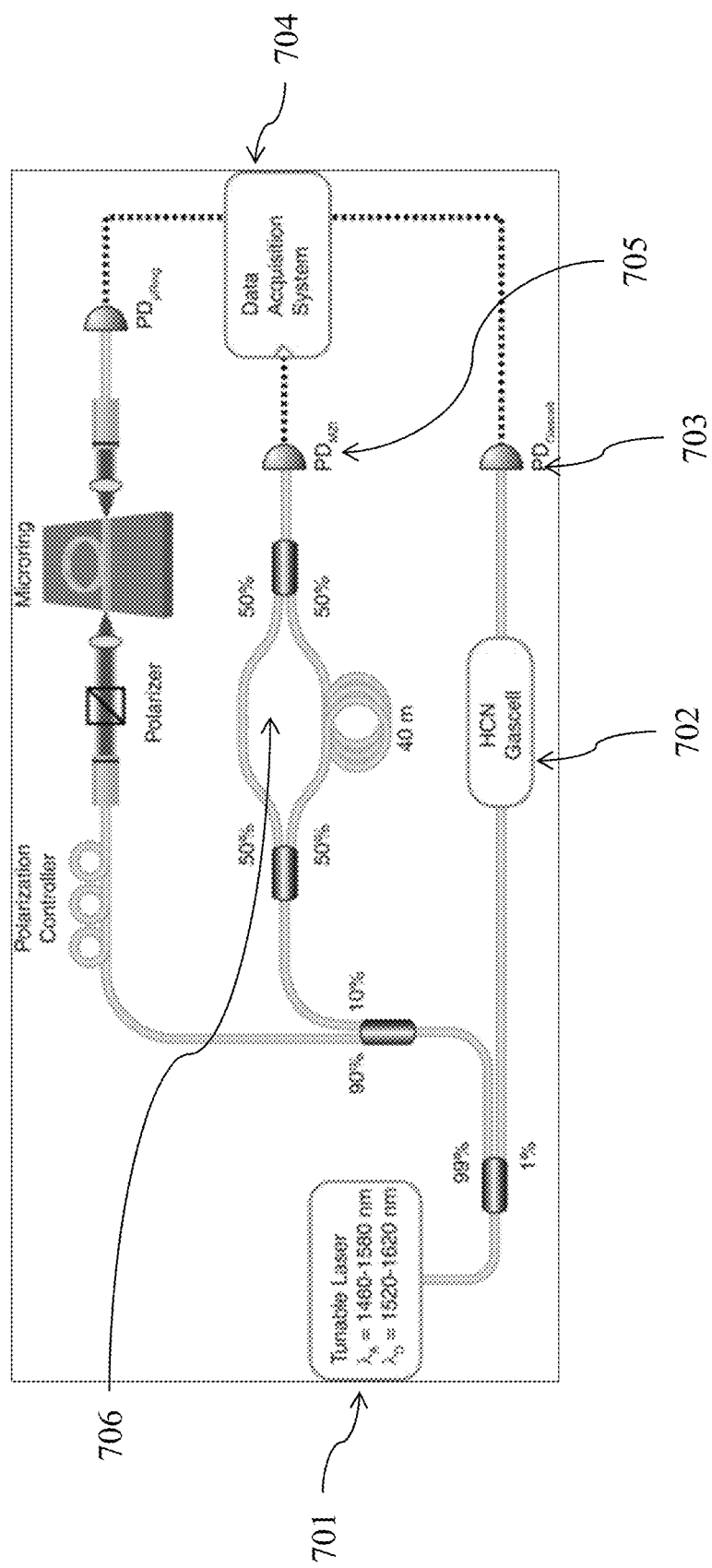
FIG. 7 depicts a dispersion measurement setup according to embodiments of the present disclosure.

FIG. 7 shows a schematic diagram of a dispersion measurement setup according to embodiments of the present disclosure. The microresonator transmission, from which quality factor and FSR values are determined, is measured using a tunable laser 701 (for example, an Ando AQ4321A, Ando AQ4321D) swept through its full wavelength tuning range (AQ4321A: 1480 to 1580 nm, AD4321D: 1520 to 1620 nm) at a tuning rate of 40 nm/s. For absolute wavelength calibration, 1% of the laser output is directed into a fiber coupled hydrogen cyanide gas cell 702 (for example, an HCN-13-100, Wavelength References Inc.) and then into a photodetector 703 ($PD_{Gascell}$). The microresonator and gas cell transmission are recorded during the laser sweep by a data acquisition system 704 (for example, a National Instruments, PCI-6132) whose sample clock is derived from a photodetector 705 ($PD_{MZI}$) monitoring the laser transmission through an unbalanced fiber Mach-Zehnder Interferometer 706 (MZI). The MZI has a path length difference of approximately 40 m, making the measurement optical frequency sampling resolution 5 MHz.

Figure 8:
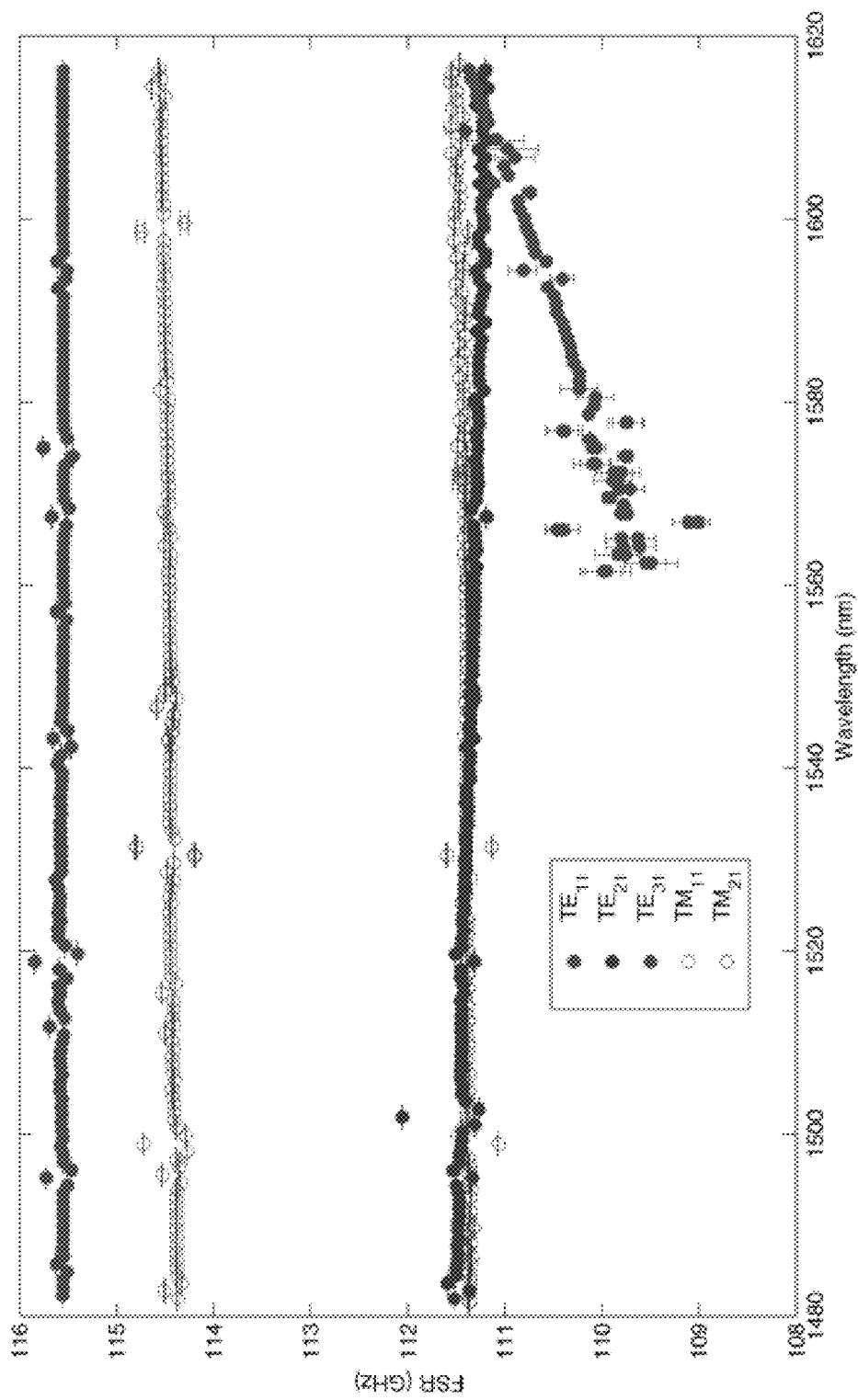
FIG. 8 depicts wavelength-dependent FSRs of five identifiable mode families according to embodiments of the present disclosure.

The absolute wavelength of each sweep is determined by fitting 51 absorption features present in the gas cell transmission to determine their subsample position, assigning them known traceable wavelengths and calculating a linear fit in order to determine the full sweep wavelength information. Each resonance is fitted with a Lorentzian lineshape unless a cluster of resonances were deemed too close to achieve a conclusive fit with a single Lorentzian. Then, an N-Lorentzian fit was utilized where N is the number of resonances being fitted. FIG. 8 plots the wavelength-dependent free spectral range (FSR) of the five identifiable mode families (3 TE and 2 TM) in the ring resonator. The dispersion of the ring resonator is then determined by analyzing the wavelength dependence of the FSR.

The non-equidistance of the modes in ring resonators according to the present disclosure can be estimated as $D_2=-225$ kHz (or 0.0025 when normalized to the cavity linewidth). Compared to the resonance linewidth, $2\gamma_0=180$ MHz, the non-equidistance is insignificant and thus comb spacing alterations due to mode interaction are pronounced in our ring resonator. The frequency shift $\Delta_a$ of mode a due to interaction with mode b can be estimated using the formula $$\Delta_a = -\frac{K^2}{\Delta},$$

where K is the interaction constant and $\Delta$ is the difference in eigenfrequencies of the interacting modes (a and b). Even with an assumption of large $\Delta$ of 10 GHz, a small mode interaction constant $K=0.75\gamma_0$ can change the local dispersion from $D_2$ of $-225$ kHz to $D_2$ of $+225$ kHz.

Figure 9:
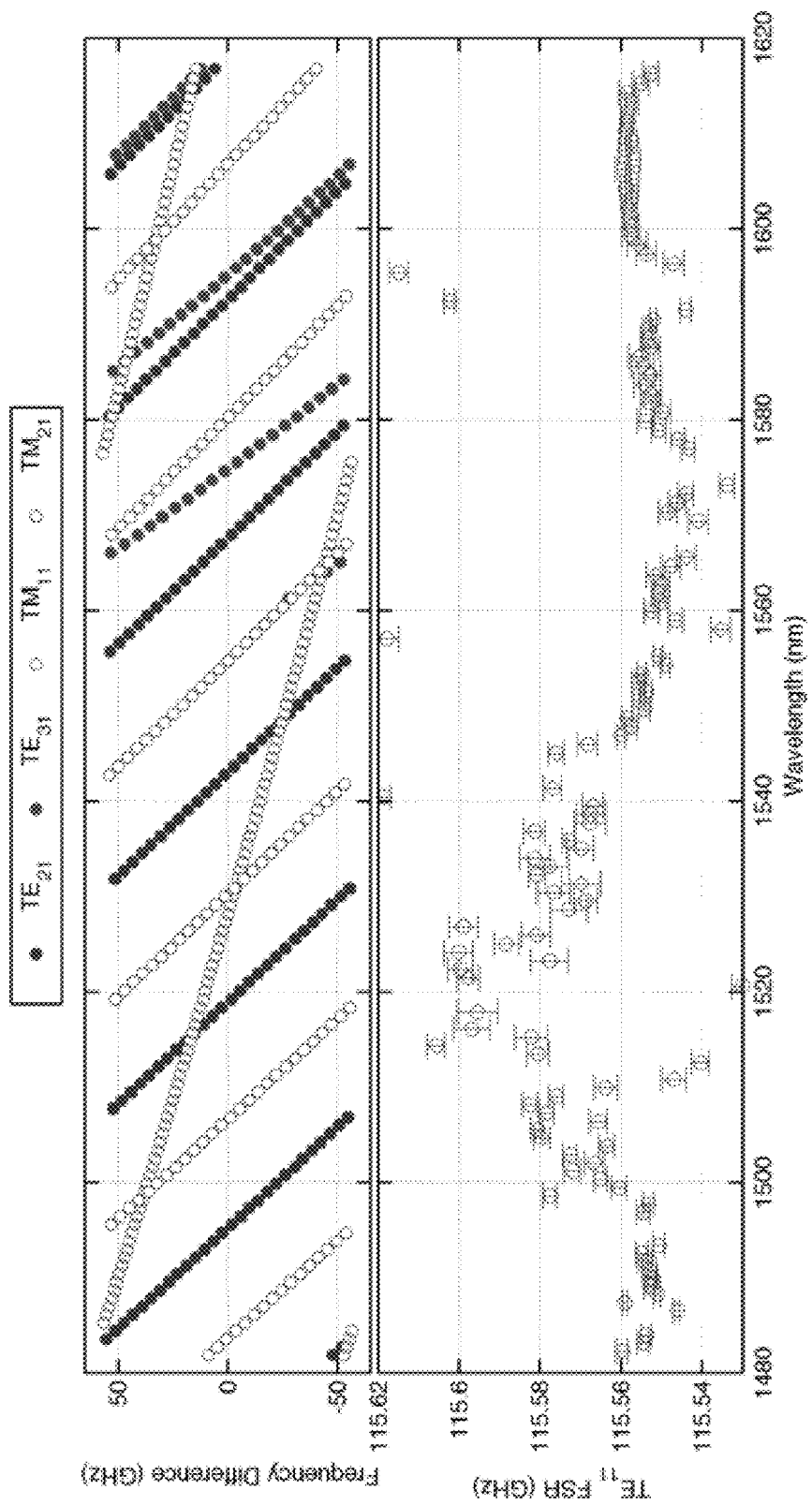
FIG. 9 depicts frequency offset and FSR of the modal families according to embodiments of the present disclosure.

FIG. 9 plots the resonance frequency offsets with respect to the fundamental mode family (top) as well as the wavelength-dependent FSRs of the fundamental mode family (bottom). The zero crossings on the upper panel represent the wavelengths where the fundamental mode family experiences mode crossings with other higher order mode families. The lower panel then shows that the disruption of the dispersion continuity of the fundamental mode family is dominated by the mode interaction with the first higher order TE mode family.

Hyperparametric oscillation in an anomalous dispersion microresonator starts from the modulation instability of the intra-cavity CW light. When the intra-cavity power exceeds a certain threshold, the CW field becomes modulated and the modes of the resonator that is phase matched start to grow. Since most materials possess positive Kerr nonlinearities, anomalous GVD is tuned in prior resonators to satisfy the phase matching condition. Increase of the optical power can result in solution formation, leading to the generation of a broad frequency comb and short pulses.

Hyperparametric oscillation as well as frequency comb formation is also possible in the case of normal GVD, but a non-zero initial condition is required for frequency comb and pulse generation. In microresonators according to the present disclosure, the comb can be ignited due to the change of local GVD resulting from the mode interaction between the fundamental mode family, which has a normal GVD, and the first higher order mode family, which has an anomalous GVD (see FIG. 1B). Mode interaction enables excitation of the hyperparametric oscillation from zero initial conditions. It is possible then to introduce a non-adiabatic change to the system parameters and transfer the system from the hyper-parametric oscillation regime to the frequency comb generation regime. Here a non-adiabatic change means a stepwise change of resonance detuning or pump power, instead of a continuous scan, in a time shorter than the time of the comb growth, which can be much longer compared to the cavity lifetime.

Figure 10A:
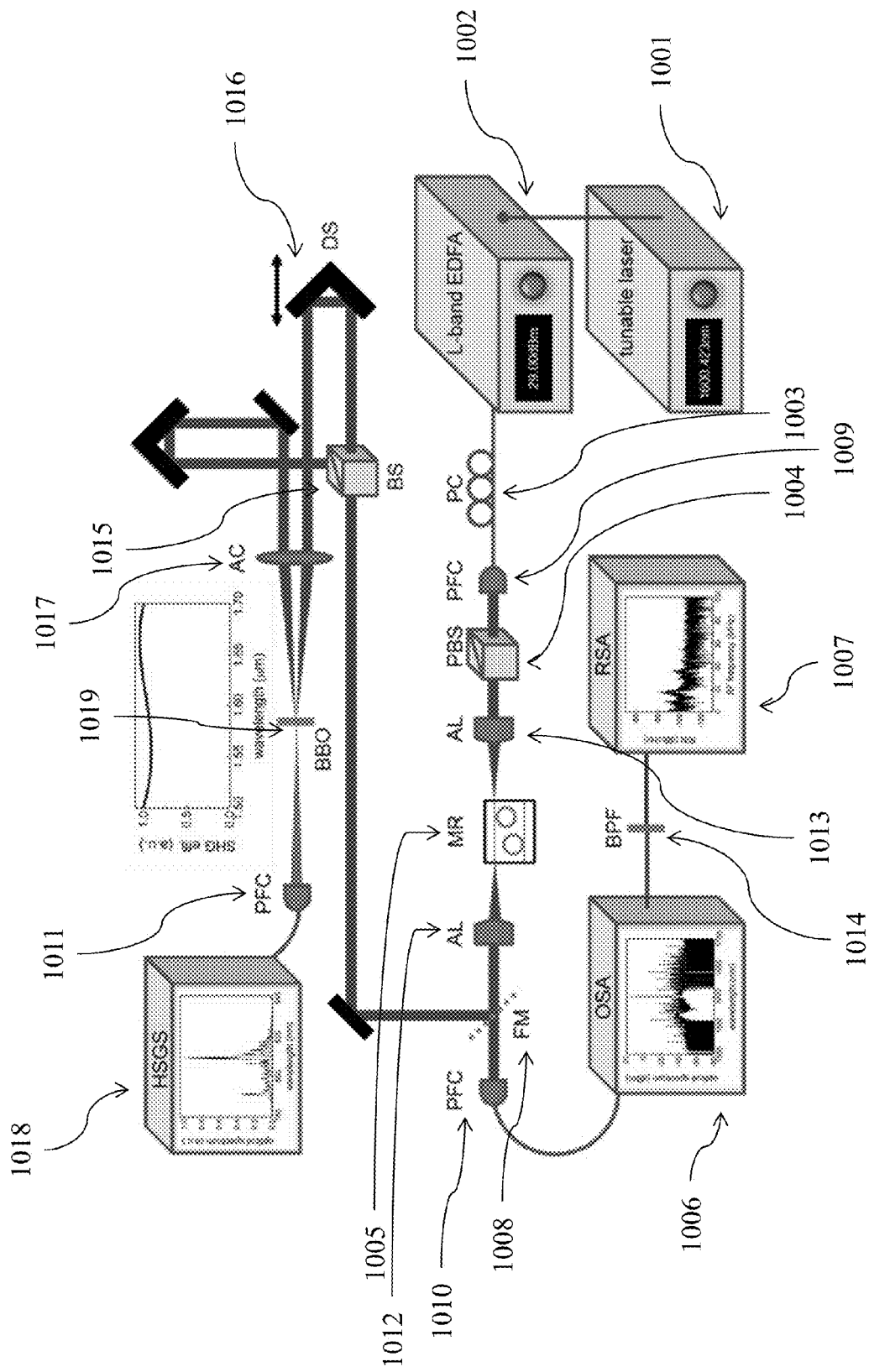
FIG. 10A is a schematic of a comb and pulse generation and characterization setup according to embodiments of the present disclosure.

FIG. 10A shows the schematic diagram of the comb and pulse generation and characterization setup according to an embodiment of the present disclosure. The setup includes PC, polarization controller 1003; PFC, pigtailed fiber coupler 1009-11; PBS, polarization beamsplitter 1004; AL, aspheric lens 1012-13; MR, micro-resonator 1005; FM, flip mirror 1008; OSA, optical spectrum analyzer 1006; BPF, bandpass filter 1014; RSA, RF spectrum analyzer 1007; BS, beamsplitter 1015; DS, delay stage 1016; AC, achromatic lens 1017; HSGS, high-sensitivity grating spectrometer 1018; and BBO, β-barium borate 1019.

The cw pump started from an external cavity stabilized tunable laser 1001 (for example, a Santec TSL-510C). The linewidth of the laser is 200 kHz and the frequency stability over an hour is 120 MHz. The pump power is increased from 8 dBm to 29 dBm in an L-band EDFA 1002 (for example, a Manlight HWT-EDFA-B-SC-L30-FC/APC). A 3-paddle fiber polarization controller 1003 and a polarization beam splitter cube 1004 are used to ensure the proper coupling of TE polarization into the microresonator 1005. The total fiberchip-fiber loss is 6 dB. The microresonator chip is mounted on a temperature controlled stage set to 60° C. The temperature stability over an hour is 0.1° C. so that the change in coupling loss is negligible (<0.5%). The output light is sent to an optical spectrum analyzer 1006 (for example, an Advantest Q8384) and a photodiode (for example, a Thorlabs DET01CFC) connected to an RF spectrum analyzer 1007 (for example, an Agilent E4440A) for monitoring of comb spectrum and RF amplitude noise, respectively. The output light can also be sent by a flip mirror 1008 to the FROG setup for pulse characterization.

The FROG apparatus consists of a lab-built interferometer with a 1 mm thick β-BBO crystal and a high-sensitivity grating spectrometer with a cryogenically-cooled deep-depletion 1024 256 Si CCD array (for example, an Horiba Jobin Yvon CCD-1024×256-BIDD-1LS). The use of dispersive optics is minimized and no fiber is used in the FROG apparatus such that the additional dispersion introduced to the pulse is only ~50 fs$^2$. The FROG can detect pulses with a bandwidth of >200 nm and a pulse energy of <100 aJ (10 μW average power) with a 1 second exposure time. With the sensitive FROG, no additional optical bandpass filtering and amplification is needed (minimizing pulse distortion), though there is a small amount of dispersive filtering and intensity modification with the coupling optics and ring-waveguide coupling. The FROG reconstruction is done iteratively using a genetic algorithm. The genetic algorithm is a global search method based on ideas taken from evolution and is less susceptible to becoming trapped by local extrema in the search space. Both the spectral amplitudes and phases are encoded as strings of 8-bit chromosomes and two genetic operators, crossover and mutation, are used to generate the next-generation solutions. Tournament selection with elitism is employed to ensure monotonically convergence of the solution. The FROG error is defined as $$\varepsilon = \sqrt{\frac{1}{N^2}\Sigma_{i,j=1}^{N} |S_{mea}(\omega,t) - S_{ret}(\omega,t)|^2},$$

where $S_{mea}(\omega,t)$ and $S_{ret}(\omega,t)$ are the measured and reconstructed spectrograms.

Figure 10B:
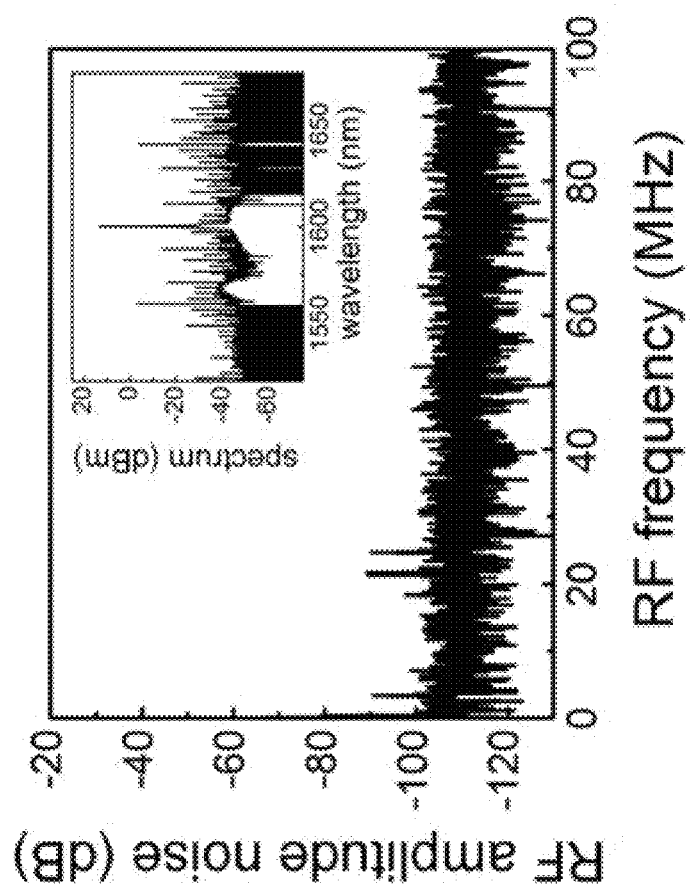
FIG. 10B depicts RF spikes according to embodiments of the present disclosure.
Figure 10C:
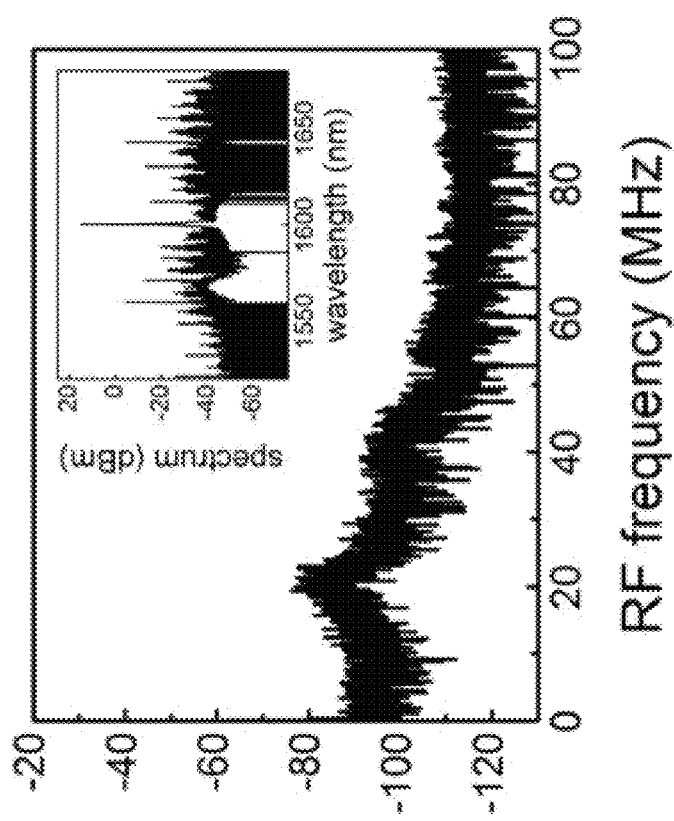
FIG. 10C depicts a continuous RF noise spectrum according to embodiments of the present disclosure.

As the pump wavelength is tuned into the resonance from the high frequency side, multiple RF spikes are observed and the number of spikes increases as more power is coupled into the microresonator (FIG. 10B). As the pump wavelength is tuned further into resonance and more power is coupled into the microresonator, the bandwidth of the secondary comb families grows and the spectral overlap between them becomes more extensive, resulting in an increase of RF amplitude noise and merging of multiple RF spikes to form a continuous RF noise spectrum (FIG. 10C). After sweeping the detuning and power levels to generate a broad comb spectrum, an abrupt discrete step jump is performed in both detuning and power to achieve the low phase noise state, thus a set of parameters are found at which the RF amplitude noise drops by orders of magnitude and approaches the detector background noise. The phase-locked comb typically stabilizes for more than three hours.

Figure 11A:
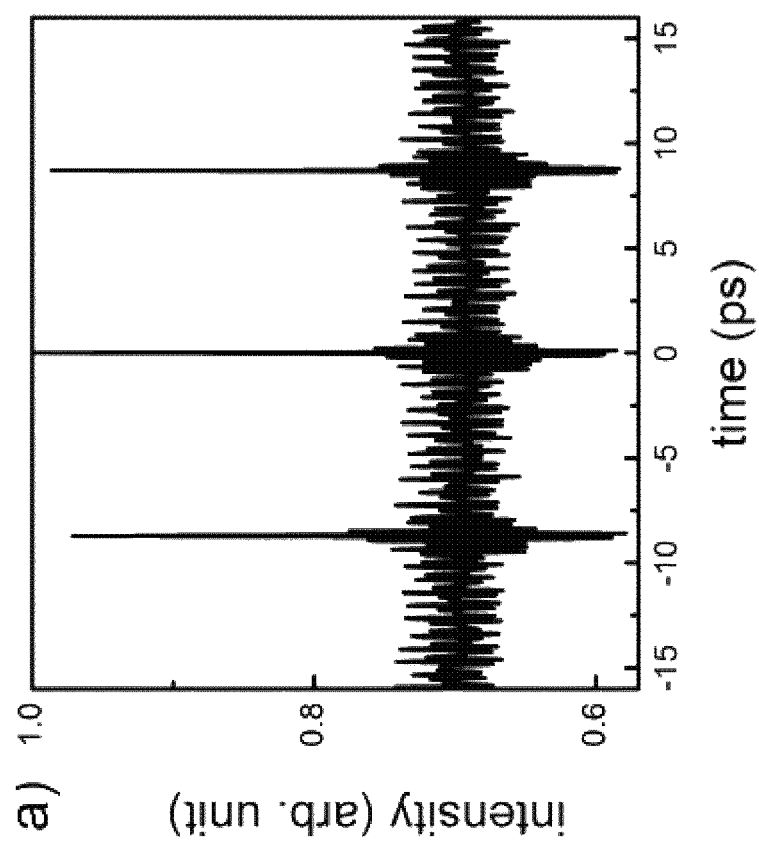
FIGS. 11A-C depict measured intensity auto-correlation of a generated pulse train according to embodiments of the present disclosure.
Figure 11B:
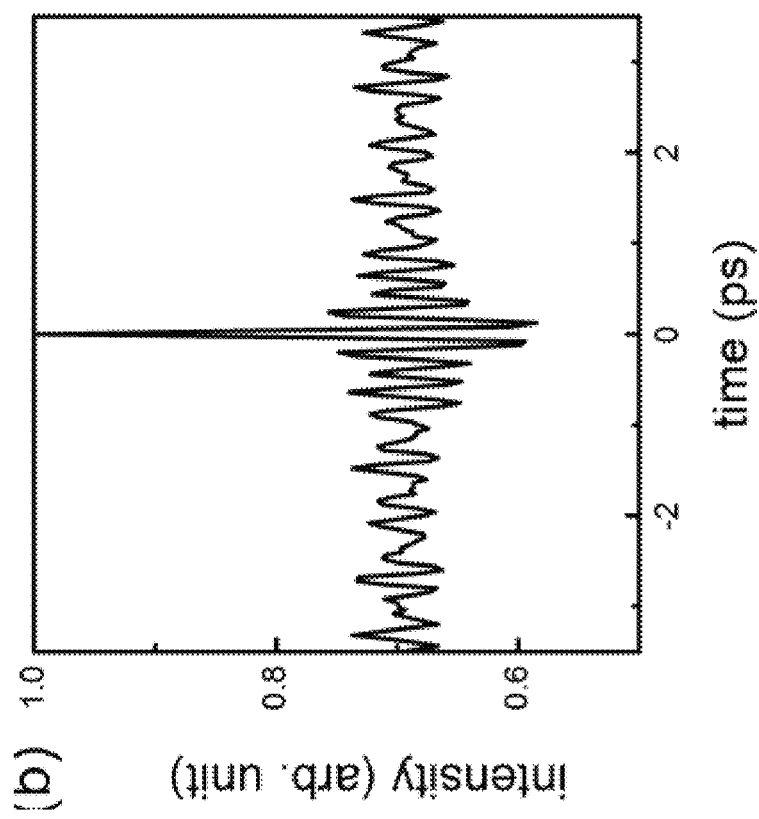
Figure 11C:
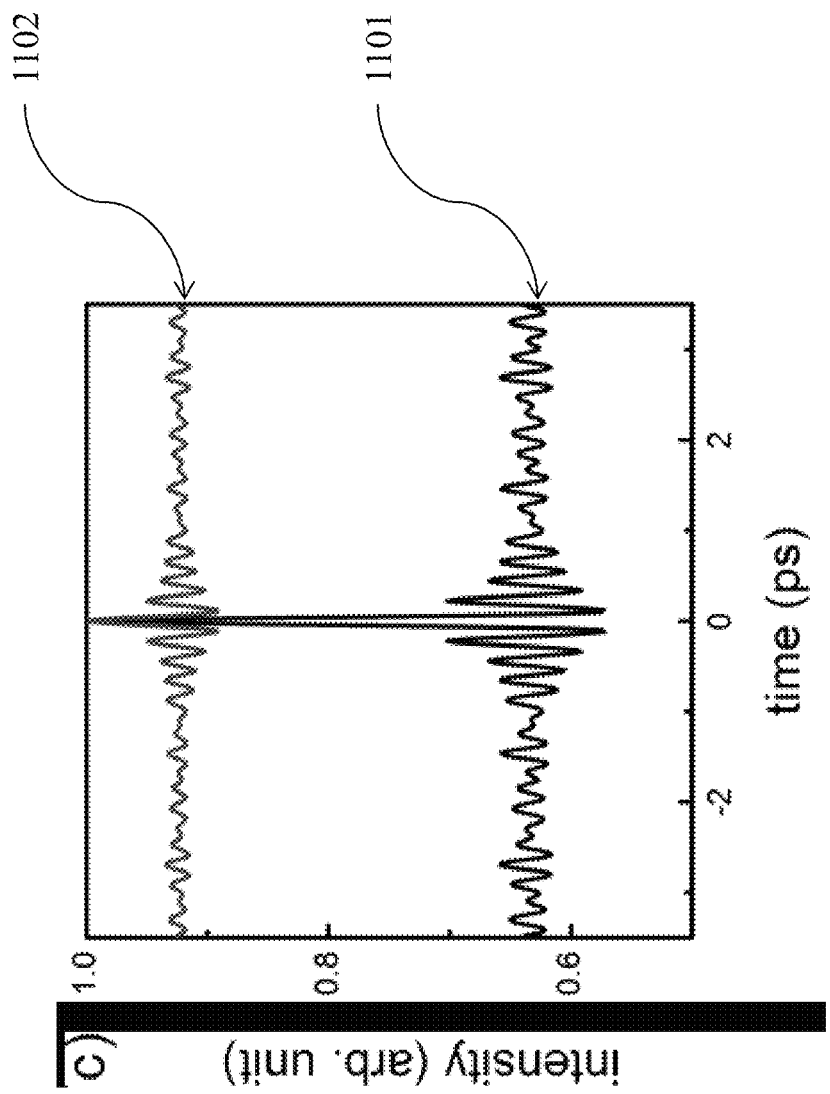

FIG. 11A shows an intensity auto-correlation (AC) trace of the generated pulse train and FIG. 11B shows a zoomed view of the AC trace. The pulses are separated by 8.7 ps, the inverse of microresonator free spectral range. Between the pulses, temporal interferometric fringes due to the presence of the primary comb lines are observed. This is not an interferometric auto-correlation and thus the temporal fringes in the AC trace represent the oscillating structures of the pulse shape. Between the pulses, temporal fringes with a period of ~200 fs are clearly observed and these fringes arise due to the presence of the primary comb lines, ±4.85(01156×42) THz away from the CW pump. Such oscillating structures are also captured in the pulse shape retrieved from the FROG measurement as depicted in FIG. 3D. On the other hand, FIG. 11C shows the calculated AC traces of a stable pulse train (black curve 1101) and an unstable pulse train (red curve 1102). For the stable pulse train, a flat spectral phase is assumed. For the unstable pulse train, a random spectral phase is assumed and the AC trace is calculated by averaging over 1000 pulses. As the instability results in the increasing background of the AC trace, the measured AC trace (FIG. 11B) shows that the instability of the generated pulse train is minimal.

The results of looking for the Gaussian solution of Equation 1 located at cw background and using the variational method to find parameters of the solution are as follows. In Equation 7, $P_c$ is the power of the cw background, $\phi_c$ is the phase of the background wave, $P_p$ is the pulse peak power ($E_p = P_p \tau$ is the pulse energy), q is the chirp, $\tau$ is the pulse duration, and $\phi_p$ is the phase of the pulse.

$$\begin{cases} A(T,t) = A_c + A_p(T,t) \\ A_c = \sqrt{P_c}\, e^{i\varphi_c} \\ A_p(T,t) = \sqrt{\dfrac{P_p}{\sqrt{\pi}}} \left[ \exp\left(\dfrac{t}{\sqrt{2}\,\tau}\right)^2 \right]^{-1-iq} e^{i\varphi_p} \end{cases} \quad \text{Equation 7}$$

Substituting Equation 7 into Equation 1 and assuming that the pulse energy is much lower than the cw energy but the pulse peak power is much higher than the DC background ($P_c T_R/P_p \tau \gg 1$ and $P_p/P_c \gg 1$), the equation describing the cw background is given by Equation 8, and the approximate solution by Equation 9.

$$\sqrt{P_c}\left(\alpha + \frac{T_c}{2} + i\delta_0 - i\gamma P_c\right) = i\sqrt{T_c P_{in}}\, e^{i(\varphi_{in}-\varphi_c)} \quad \text{Equation 8}$$

$$\begin{cases} \varphi_{in} - \varphi_c \cong \dfrac{\alpha + T_c/c}{\delta_0} \\ P_c \cong \dfrac{T_c P_{in}}{\delta_0^2}\left(1 + \dfrac{2T_c \gamma P_{in}}{\delta_0^3}\right) \end{cases} \quad \text{Equation 9}$$

On the other hand, the time-dependent part of Equation 1 can be written as Equation 10

$$\begin{cases} T_R \dfrac{\partial}{\partial T} A_p + \dfrac{i}{2}\beta_{2\Sigma} \dfrac{\partial^2}{\partial t^2} A_p - i\gamma |A_p|^2 A_p = R(T,t) \\ \\ R(T,t) = \dfrac{T_c}{2\Omega_f^2} \dfrac{\partial^2}{\partial t^2} A_p - \left(\alpha + \dfrac{T_c}{2} + i\delta_0\right) A_p + \\ \\ i\left[\gamma(|A_c + A_p|^2(A_c + A_p) - |A_p|^2 A_p) - \dfrac{\gamma}{T_R}\displaystyle\int_{-T_R/2}^{T_R/2} A|A|^2 dt\right] \end{cases} \quad \text{Equation 10}$$

To describe the behavior of the pulse generated in the resonator the values of four parameters must be found: $P_p$, $\phi_p$, q, and $\tau$. The parameters are connected by a set of self-consistent equations which can be found using a variational approach. The Lagrangian density $$L = \frac{T_R}{2}\left(A_p^* \frac{\partial A_p}{\partial T} - A_p \frac{\partial A_p^*}{\partial T}\right) - \frac{i}{2}\left(\beta_{2\Sigma}\left|\frac{\partial}{\partial t}A_p\right| + \gamma |A_p|^4\right)$$

and the variation of the Lagrangian density results are introduced in the unperturbed nonlinear Schrödinger equation in Equation 11.

$$\frac{\delta L}{\delta A^*} = \frac{\partial L}{\partial A^*} - \frac{\partial}{\partial T}\frac{\partial L}{\partial(\partial A^*/\partial T)} - \frac{\partial}{\partial t}\frac{\partial L}{\partial(\partial A^*/\partial T)} = \quad \text{Equation 11}$$

$$T_R \frac{\partial}{\partial T}A_p + \frac{i}{2}\beta_{2\Sigma}\frac{\partial^2}{\partial t^2}A_p - i\gamma|A_p|^2 A_p = 0$$

Taking into account that A does not depend on T directly, yields Equation 12.

$$\frac{\partial}{\partial T}A_p = \frac{\partial A_p}{\partial P_p}\frac{\partial P_p}{\partial T} + \frac{\partial A_p}{\partial \varphi_p}\frac{\partial \varphi_p}{\partial T} + \frac{\partial A_p}{\partial q}\frac{\partial q}{\partial T} + \frac{\partial A_p}{\partial \tau}\frac{\partial \tau}{\partial T} \quad \text{Equation 12}$$

From Equation 7, Equation 11, and Equation 12, the Lagrangian of the system and the Lagrangian equations can be written as Equation 13 and Equation 14, where $\dot{r}_j = \{\partial P_p/\partial T, \partial \varphi_p/\partial T, \partial q/\partial T, \partial \tau/\partial T\}$ and $r_j = \{P_p, \varphi_p, q, \tau\}$.

$$L = -i\frac{\beta_{2\Sigma}P_p}{4\tau}(1+q^2) - \frac{i}{2\sqrt{2\pi}}\gamma P_p^2 \tau + \quad \text{Equation 13}$$
$$\frac{i}{4}P_p T_R\left[2q\frac{\partial \tau}{\partial T} - \tau\left(\frac{\partial q}{\partial T} - 4\frac{\partial \varphi_p}{\partial T}\right)\right]$$

$$\frac{d}{dT}\left(\frac{\partial L}{\partial \dot{r}_j}\right) - \frac{\partial L}{\partial r_j} = \int_{-\infty}^{\infty}\left(R^*\frac{\partial A_p}{\partial r_j} - R\frac{\partial A_p^*}{\partial r_j}\right)dt \quad \text{Equation 14}$$

Again, assuming that the pulse energy is much lower than the cw energy but the pulse peak power is much higher than the DC background ($P_c T_R/P_p \tau \gg 1$ and $P_p/P_c \gg 1$), yields the equations describing the Gaussian pulse according to Equation 15.

$$\begin{cases} T_R \dfrac{dE_p}{dT} = -E_p\left[T_c + 2\alpha + T_c\dfrac{1+q^2}{2\Omega_f^2\tau^2} + \right. \\ \left. \dfrac{2\sqrt{2}}{(\pi(9+q^2))^{1/4}}\gamma\sqrt{P_p P_c}\sin(\varphi_c - \varphi_p - \varphi_q)\right] \\ T_R \dfrac{d\varphi_p}{dT} = \dfrac{\beta_{2\Sigma}}{2\tau^2} + \dfrac{5}{4\sqrt{2\pi}}\gamma P_p - \delta_0 - \dfrac{qT_c}{2\Omega_f^2\tau^2} \\ T_R \dfrac{dq}{dT} = -\dfrac{T_R}{E_p}q\dfrac{dE_p}{dT} + \dfrac{\beta_{2\Sigma}}{\tau^2}(1+q^2) + \dfrac{1}{\sqrt{2\pi}}\gamma P_p - \left(T_c + 2\alpha + \dfrac{3}{2}T_c\dfrac{1+q^2}{\Omega_f^2\tau^2}\right)q \\ T_R \dfrac{d\tau}{dT} = -\dfrac{T_R}{2E_p}\tau^2\dfrac{dE_p}{dT} + \beta_{2\Sigma}q - T_c\dfrac{3q^2-1}{4\Omega_f^2} - \dfrac{\tau^2}{2}(T_c + 2\alpha) \\ \sqrt{3 - iq} = (9+q^2)^{1/4}e^{i\varphi_q} \end{cases}$$

Equation 15

Further assuming that $q^2 \gg \Omega_f^2\tau^2 \gg 1$, yields the approximate solution in Equation 16.

$$\begin{cases} E_p \cong \dfrac{8\sqrt{10\pi}}{15}\dfrac{\beta_{2\Sigma}^{\frac{3}{2}}\Omega_f^2\sqrt{\delta_0}}{T_c\gamma} \\ \sin(\varphi_c - \varphi_p - \varphi_q) \cong -\dfrac{9}{64\sqrt{5}}\dfrac{(1+q^2)(2(9+q^2))^{1/4}T_c^3\sqrt{\delta_0}}{\beta_{2\Sigma}^3\Omega_f^6\sqrt{\gamma P_c}} \\ q \cong \dfrac{4\beta_{2\Sigma}\Omega_f^2}{3T_c} \\ \tau \cong \dfrac{2\sqrt{5}}{3}\dfrac{\beta_{2\Sigma}^{\frac{3}{2}}\Omega_f^2}{T_c\sqrt{\delta_0}} \end{cases}$$

Equation 16

While the disclosed subject matter is described herein in terms of certain exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. An apparatus for generating a frequency comb comprising:
a continuous wave pump coupled to a microring resonator, the microring resonator configured to emit a mode-locking frequency comb by normal dispersion, wherein:
the mode-locking frequency comb is coherent;
the mode-locking frequency comb comprises at least about 200 mode-locked modes; and
the mode-locking frequency comb has a repetition rate of about 108 GHz to about 116 GHz.

2. The apparatus of claim 1, wherein the microring resonator has a radius of about 200 μm, a cross-sectional width of about 2 μm and a cross-sectional height of about 0.725 μm.

3. The apparatus of claim 1, wherein the microring resonator comprises silicon nitride.

4. The apparatus of claim 1, wherein the microring resonator is configured to emit an optical pulse of about 74 femtoseconds.

5. The apparatus of claim 1, further comprising a spectral filter coupled to an output of the microring resonator.

6. The apparatus of claim 5, wherein the spectral filter comprises a bandpass filter.

7. The apparatus of claim 1, wherein the mode-locking frequency comb comprises at least about 300 mode-locked modes.

8. The apparatus of claim 1, wherein the mode-locking frequency comb comprises at least about 400 mode-locked modes.

9. The apparatus of claim 1, wherein the mode-locking frequency comb has a span of at least about 200 nm.

* * * * *